(12) United States Patent
Cypher

(10) Patent No.: US 7,117,312 B1
(45) Date of Patent: Oct. 3, 2006

(54) MECHANISM AND METHOD EMPLOYING A PLURALITY OF HASH FUNCTIONS FOR CACHE SNOOP FILTERING

(75) Inventor: Robert E. Cypher, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 344 days.

(21) Appl. No.: 10/821,380

(22) Filed: Apr. 9, 2004

Related U.S. Application Data

(60) Provisional application No. 60/520,619, filed on Nov. 17, 2003.

(51) Int. Cl.
*G06F 12/00* (2006.01)

(52) U.S. Cl. ...................... 711/146; 711/216

(58) Field of Classification Search ............... 711/146, 711/216
See application file for complete search history.

(56) References Cited

U.S. PATENT DOCUMENTS

| | | | |
|---|---|---|---|
| 5,446,863 A | | 8/1995 | Stevens et al. |
| 5,966,729 A | * | 10/1999 | Phelps ................ 711/146 |
| 6,370,622 B1 | * | 4/2002 | Chiou et al. ............ 711/146 |
| 6,725,342 B1 | * | 4/2004 | Coulson ................ 711/141 |
| 6,748,463 B1 | | 6/2004 | Tsuboi et al. |
| 2003/0093630 A1 | * | 5/2003 | Richard et al. ........... 711/154 |
| 2003/0177317 A1 | * | 9/2003 | Anderson et al. ......... 711/146 |
| 2004/0003184 A1 | * | 1/2004 | Safranek et al. .......... 711/146 |
| 2004/0186964 A1 | * | 9/2004 | Dieffenderfer et al. .... 711/146 |

* cited by examiner

*Primary Examiner*—Matthew Kim
*Assistant Examiner*—Shane M. Thomas
(74) *Attorney, Agent, or Firm*—Meyertons Hood Kivlin Kowert & Goetzel, P.C.; B. Noël Kivlin; Stephen J. Curran

(57) ABSTRACT

A mechanism for filtering snoop requests to a cache memory includes, in one embodiment, a first storage that may store a first set of corresponding snoop filter indications. The mechanism also includes a second storage that may store a second set of corresponding snoop filter indications. Further, the mechanism includes a cache controller configured to receive a transaction request including an address. The cache controller generates a first index value for accessing the first storage by performing a first hash function on the address. In addition, the cache controller generates a second index value for accessing the second storage by performing a second hash function on the address. The cache controller may further selectively generate a snoop operation to the cache memory for the transaction request dependent upon a corresponding snoop filter indication stored in each of the first storage and the second storage that corresponds to the address.

17 Claims, 4 Drawing Sheets

MECHANISM AND METHOD EMPLOYING A PLURALITY OF HASH FUNCTIONS FOR CACHE SNOOP FILTERING

This application claims the benefit of U.S. Provisional Application No. 60/520,619 filed Nov. 17, 2003.

BACKGROUND OF THE INVENTION

1. Field of the Invention

This invention relates to computer systems including processors that employ cache memory subsystems and, more particularly, to reducing the number of snoop transactions to a cache memory using a snoop filter.

2. Description of the Related Art

A cache memory is a high-speed memory unit interposed in the memory hierarchy of a computer system between a slower system memory and a processor. A cache typically stores recently used data to improve effective memory transfer rates to thereby improve system performance. The cache is usually implemented by semiconductor memory devices having speeds that are comparable to the speed of the processor, while the system memory utilizes a less costly, lower speed technology.

A cache memory typically includes a plurality of memory locations that each stores a block or a "line" of two or more words. Each line in the cache has associated with it an address tag that is used to uniquely identify the address of the line. The address tags are typically included within a tag array memory device. Additional bits may further be stored for each line along with the address tag to identify the coherency state of the line.

A processor may read from or write directly into one or more lines in the cache if the lines are present in the cache and if the coherency state allows the access. For example, when a read request originates in the processor for a new word, whether data or instruction, an address tag comparison is made to determine whether a valid copy of the requested word resides in a line of the cache memory. If the line is present, a cache "hit" has occurred and the data is used directly from the cache. If the line is not present, a cache "miss" has occurred and a line containing the requested word is retrieved from the system memory and may be stored in the cache memory. The requested line is simultaneously supplied to the processor to satisfy the request.

Similarly, when the processor generates a write request, an address tag comparison is made to determine whether the line into which data is to be written resides in the cache. If the line is present, the data may be written directly into the cache (assuming the coherency state for the line allows for such modification). If the line does not exist in the cache, a line corresponding to the address being written may be allocated within the cache, and the data may be written into the allocated line.

Because two or more copies of a particular piece of data can exist in more than one storage location within a cache-based computer system, coherency among the data is necessary. Various coherency protocols and specialized bus transfer mechanisms may be employed for this purpose depending on the complexity of the system as well as its requirements. For example, coherence between the cache and the system memory during processor writes may be maintained by employing either a "write-through" or a "write-back" technique. The former technique guarantees consistency between the cache and the system memory by writing the same data to both locations. The latter technique handles coherency by writing only to the cache, and by marking the entry in the cache as being modified. When a modified cache entry is later removed during a cache replacement cycle (or is required by a device other than the processor), the modified data is typically written back to the system memory (and/or provided to the requesting device).

In a multiprocessor shared-memory computer system, separate caches associated with each of the processors may simultaneously store data corresponding to the same memory location. Thus, memory coherency within such systems must typically be handled using somewhat more elaborate and complex schemes. For example, coherency in multiprocessor shared-memory systems may be maintained through employment of either a directory-based protocol or a snooping protocol. In a directory-based protocol, a directory is maintained that indicates which processors have copies of each cache line. This directory is used to limit the processors that must monitor, and possibly respond to, a given request for a cache line. The use of directories reduces snoop traffic and thus allows larger systems to be built. However, the use of directories typically increases the system's latency (which is caused by the directory lookup), as well as the system's hardware complexity and cost.

In a snooping protocol, each processor broadcasts all of its requests for cache lines to all other processors. In many systems, this may be done through a common shared bus. The cache associated with each processor stores along with its address tags coherency information indicating the state of each of its stored lines. Each processor snoops the requests from other processors and responds accordingly by updating its cache tags and/or by providing the data. Thus, each request from another processor may require that a given processor access its own cache's tags to determine if the line exists within the cache, and to update the tag and/or provide the data if necessary. In systems that store cache tags off-chip, the rate at which these cache tags can be accessed may put a limit on the rate at which snoops can be processed and may further limit the bandwidth available for the processor's own cache transactions.

One solution to this problem is to store the cache tags on-chip (on the same chip as the processor), even for cache lines that are stored off-chip. However, this solution suffers from several drawbacks, including the large amount of processor area that must be devoted to maintain these cache tags, the lack of flexibility in changing off-chip cache sizes and organizations, and an increased latency when the data is present in the off-chip cache.

Regardless of whether the cache tags are stored on-chip or off-chip, snoop operations may be necessary to determine whether a remotely requested cache line exists in the cache, whether the cache line state, as reflected in the cache tags, needs to be updated or if data needs to be provided. Performance of such snoop operations may add to latency and processing overhead in computer systems.

SUMMARY

Various embodiments of a mechanism for filtering snoop requests to a cache memory are disclosed. In one embodiment, the mechanism may include a first storage including a plurality of entries configured to store a first set of corresponding snoop filter indications. The mechanism may also include a second storage including a plurality of entries configured to store a second set of corresponding snoop filter indications. Further, the mechanism may include a cache controller configured to receive a transaction request including an address. The cache controller may be configured to generate a first index value for accessing the first storage by performing a first hash function on the address. In addition, the cache controller may be configured to generate a second index value for accessing the second storage by performing a second hash function on the address. The cache controller may be further configured to selectively generate a snoop operation to the cache memory for the transaction request dependent upon a corresponding snoop filter indication stored in each of the first storage and the second storage that corresponds to the address.

Figure 1:
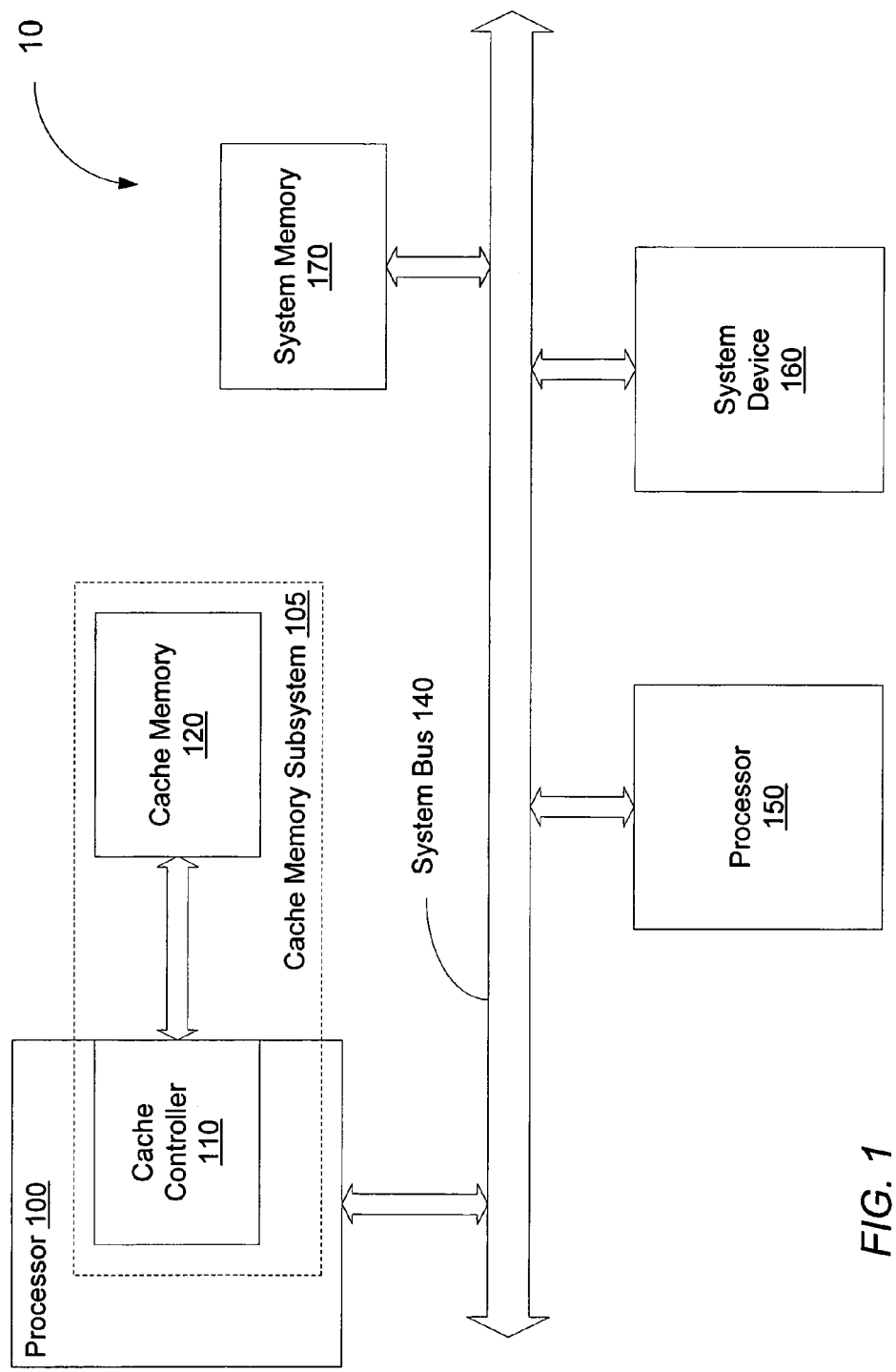
FIG. 1 is a block diagram of a multiprocessing computer system employing a cache memory subsystem.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Turning now to FIG. 1, a block diagram of one embodiment of a computer system is shown. Computer system 10 includes a processor 100, a processor 150, a system device 160 and a system memory 170 interconnected through a system bus 140. Processor 100 illustratively includes a cache controller 110 that is coupled to a cache memory 120. Cache controller 110 and cache memory 120 are collectively referred to as a cache-memory subsystem 105. For simplicity, elements shown within the processor 100 are not shown within processor 150. However, it is noted that processor 150 may be configured identically to processor 100, as illustrated.

In the illustrated embodiment, processor 100 and cache controller 110 are integrated upon a common integrated circuit chip. However, it is contemplated that in other embodiments, processor 100, and cache controller 110 may be implemented upon separate integrated circuit chips. In one embodiment, processor 100 may be illustrative of a processor in the SPARC™ family of processors although other processor architectures are possible and contemplated.

In one embodiment, cache memory 120 may include a number of memory devices (not shown). The memory devices may be implemented using some type of fast memory devices such as static random access memory (SRAM) devices or dynamic RAM (DRAM) devices implemented as pseudo-SRAM devices, for example. During operation, cache memory 120 stores a plurality of cache lines. In one embodiment, each cache line may be stored in a row formed by corresponding entries of the memory devices. For example, a given cache line is stored across a set of locations of the memory devices that may be accessed using a common index address. In addition, a tag corresponding to the address may be stored along with the cache line.

In the illustrated embodiment, system device 160 is representative of any type of system device capable of performing coherent memory transactions. For example, system device 160 may be an I/O bridge device that may perform a read/modify/write operation to a piece of data within a block of memory of system memory 170. To perform such an operation, system device 160 may need to gain ownership of the memory block and depending on the coherency protocol, the corresponding cache line within cache memory 120.

In one embodiment, system memory 170 may include one or more memory devices. In addition, system memory 170 may include a memory controller (not shown) to control accesses to the memory devices. The memory devices may be implemented using any type of device in the dynamic random access memory (DRAM) family of devices such as synchronous DRAM (SDRAM) or double data rate SDRAM (DDRSDRAM), for example. It is noted that in one embodiment, the memory devices may be mounted to one or more memory modules (not shown).

Cache memory 120 is configured to store cache lines of data. Remote devices such as processor 150 or system device 160, for example, may perform transaction requests to cache memory 120 possibly resulting in snoop operations to cache memory 120. As will be described in greater detail below in conjunction with the description of FIG. 2 through FIG. 4, to reduce the number of snoop operations to cache memory 120, cache controller 110 may implement a snoop filter that selectively generates snoop operations to cache memory 120 when the requested cache line is present in cache memory 120.

Figure 2:
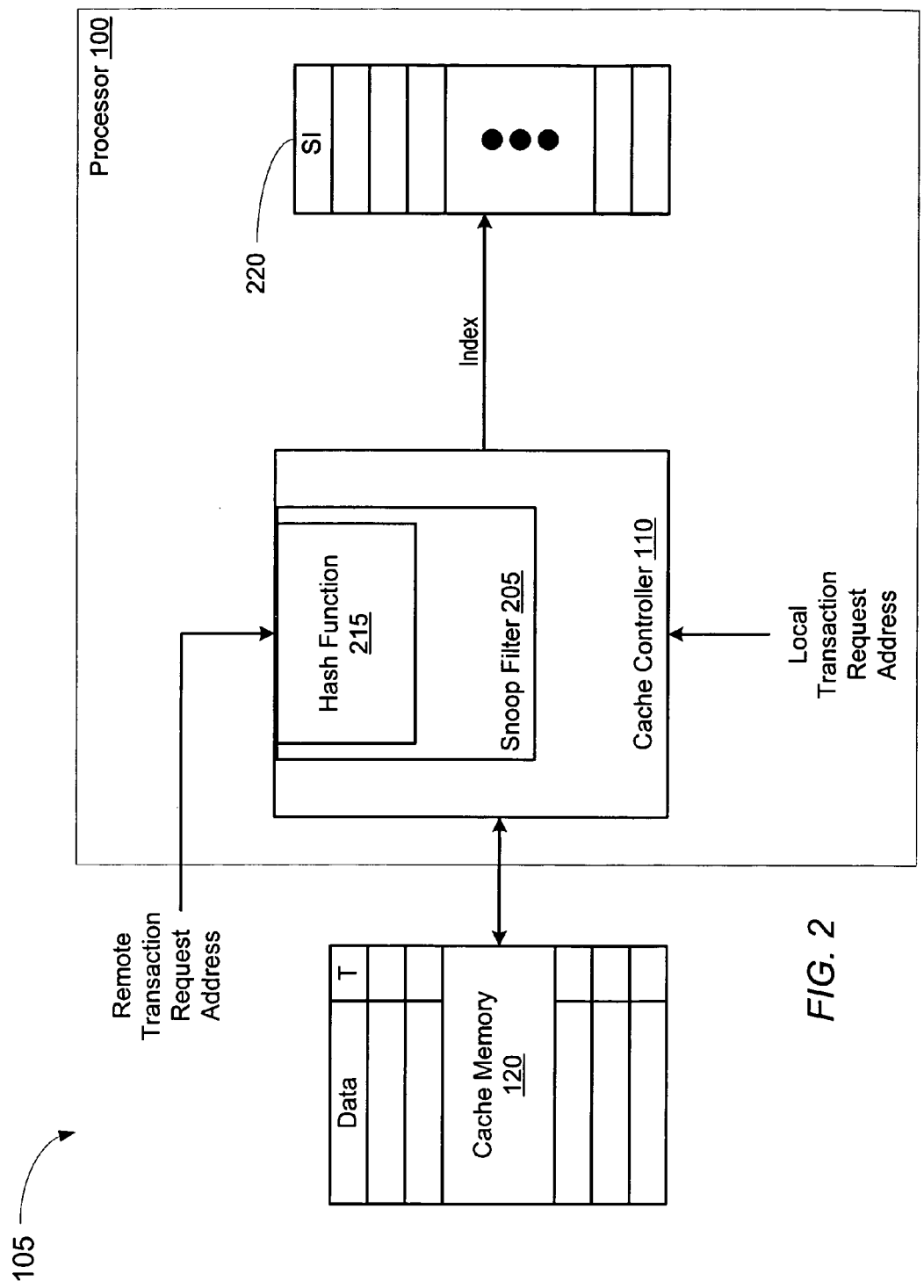
FIG. 2 is a block diagram of one embodiment of the cache memory subsystem of FIG. 1 including a snoop filter employing a hash function.

Referring to FIG. 2, a block diagram of one embodiment of cache memory subsystem 105 including a snoop filter employing a hash function is shown. Components that correspond to those shown in FIG. 1 are numbered identically for clarity and simplicity. Cache memory subsystem 105 includes a cache controller 110 coupled to a cache memory 120. Cache controller 110 is coupled to a storage 220. It is noted that in the illustrated embodiment, cache controller 110 and storage 220 are manufactured on the same integrated circuit device.

As described above, cache memory 120 is configured to store a plurality of cache lines each having a corresponding address. In addition, a tag (T) corresponding to the address may be stored along with the cache line data.

In the illustrated embodiment, cache controller 110 includes a snoop filter 205 configured to receive remote cache transaction requests that include an address from other devices such as processor 150 of FIG. 1, for example. In addition, cache controller 110 is configured to receive local cache transaction requests from core logic within processor 100. As snoop filter 205 receives each remote cache transaction request, a hash function 215 is performed on the address associated with the remote cache transaction request. In addition, hash function 215 is also performed on the address associated with some local cache transaction requests such as write requests, for example. The resultant hash function value corresponds to an index for accessing storage 220.

In the illustrated embodiment, storage 220 includes a plurality of locations. In one embodiment, each location stores a snoop filter indication (SI) and may be accessed by a corresponding index value. For example, storage 220 may include 1000 locations, numbered 0 through 999. In one embodiment, the index values may be 0 through 999. As will be described further below, in one embodiment, a snoop filter indication may be a single bit indicative of whether a given cache line is not present within cache memory 120. It is noted that in one embodiment, storage 220 may include a greater number of locations than cache memory 120.

In one embodiment, cache subsystem 200 may be initialized during an initialization of processor 100, for example. In such an embodiment, since cache memory 120 may be empty after such an initialization, each location of storage 220 may be initialized to store a snoop filter indication indicating that the corresponding cache line is not present within cache memory 120. In one embodiment, the snoop filter indication may be a single bit having a logic value of zero, for example, to indicate that a corresponding cache line is not present within cache memory 120. It is noted however, that other embodiments may use other numbers of bits and/or other logic values to indicate that the corresponding cache line is not present within cache memory 120.

During operation, the core logic of processor 100 sends local cache transaction requests to cache controller 110 to write lines of data to cache memory 120. Cache controller 110 is configured to store the lines of data to cache memory 120. In one implementation, snoop filter 205 performs hash function 215 on the address associated with each local cache transaction request to generate a hash function value. In addition, cache controller 110 is configured to store a snoop filter indication within the storage location of storage 220 that is indexed by the hash function value. In one embodiment, the snoop filter indication may be a single bit having a logic value of one to indicate that a corresponding cache line may be present within cache memory 120. It is noted however, that other embodiments may use other numbers of bits and/or other logic values to indicate that the corresponding cache line may be present within cache memory 120.

In addition, in one embodiment, snoop filter 205 is configured to filter any snoops to cache memory 120 by checking storage 220 prior to performing a snoop of cache memory 120. For example, in response to receiving a remote cache transaction request, snoop filter 205 is configured to generate a hash function value by performing a hash function on the address corresponding to a remote cache transaction request. Snoop filter 205 reads the snoop filter indication stored in the location within storage 220 indexed by the hash function value. If the snoop filter indication indicates that the cache line is not stored within cache memory 120, snoop filter 205 causes cache controller 110 to ignore the remote cache transaction request, rather than generating an associated snoop operation to cache memory 120. However, if the snoop filter indication indicates that the cache line may be stored within cache memory 120, cache controller 110 is configured to perform a snoop of the cache memory 120 for the remote cache transaction request.

Accordingly, by filtering snoops to cache memory 120, valuable bandwidth that is normally used for remote snoop transactions may be used instead for local processor transactions. However, since hash function 215 may generate the same hash function value and hence the same index for a number of different addresses within a given address range, a given snoop filter indication may only positively identify that a corresponding cache line of data is not stored within cache memory 120. In addition, as cache lines get evicted and new cache lines are stored, the snoop filter indications stored within storage 220 may become outdated and therefore erroneous. Further, as storage 220 becomes full of snoop filter indications that indicate that cache lines may be present within cache memory 120, the chance of falsely identifying a cache line as being present increases, which may make the effectiveness of snoop filter 205 decrease.

To minimize false cache line hits resulting from storage 220 filling with snoop filter indications indicating that particular cache lines may be present within cache memory 120, in one embodiment, cache controller 110 may temporarily disable snoop filter 205 from filtering snoops and a repopulation process of storage 220 may be performed. More particularly, during the repopulation process, cache controller 110 is configured to initialize each snoop filter indication to indicate that no cache lines are present within cache memory 120. In addition, cache controller 110 is configured to read each tag stored within cache memory 120. Snoop filter 205 is configured to perform hash function 215 on each tag that is read. As each new hash value and corresponding index value is generated, cache controller 110 is configured to repopulate storage 220 with up-to-date snoop filter indications for the tags in cache memory 120. It is noted that in other embodiments, the repopulation process may be performed and repeated at some predetermined interval of time. Thus, the effectiveness of snoop filter 205 may be improved when storage 220 is repopulated with up-to-date snoop filter indications. It is noted that during the repopulation process, cache controller 110 may generate snoop operations for each remote transaction request that is received.

In an alternative embodiment, hash function 215 may be structured such that separate portions of cache 120 may map to respective portions of storage 220. For example, cache 120 may be divided into four portions and storage 220 may include four portions that correspond to the four cache portions. In such an embodiment, when a given portion of storage 220 begins to be filled and thus needs to be repopulated, snoop filtering may be disabled only for that portion of cache 120 that corresponds to the portion of storage 220 needing to be repopulated. Thus, during repopulation of that portion of storage 220, snoop filtering may continue for the remaining portions of cache 120. It is contemplated that cache 120 may be divided into any number of portions and storage 220 may include a corresponding number of portions.

Figure 3:
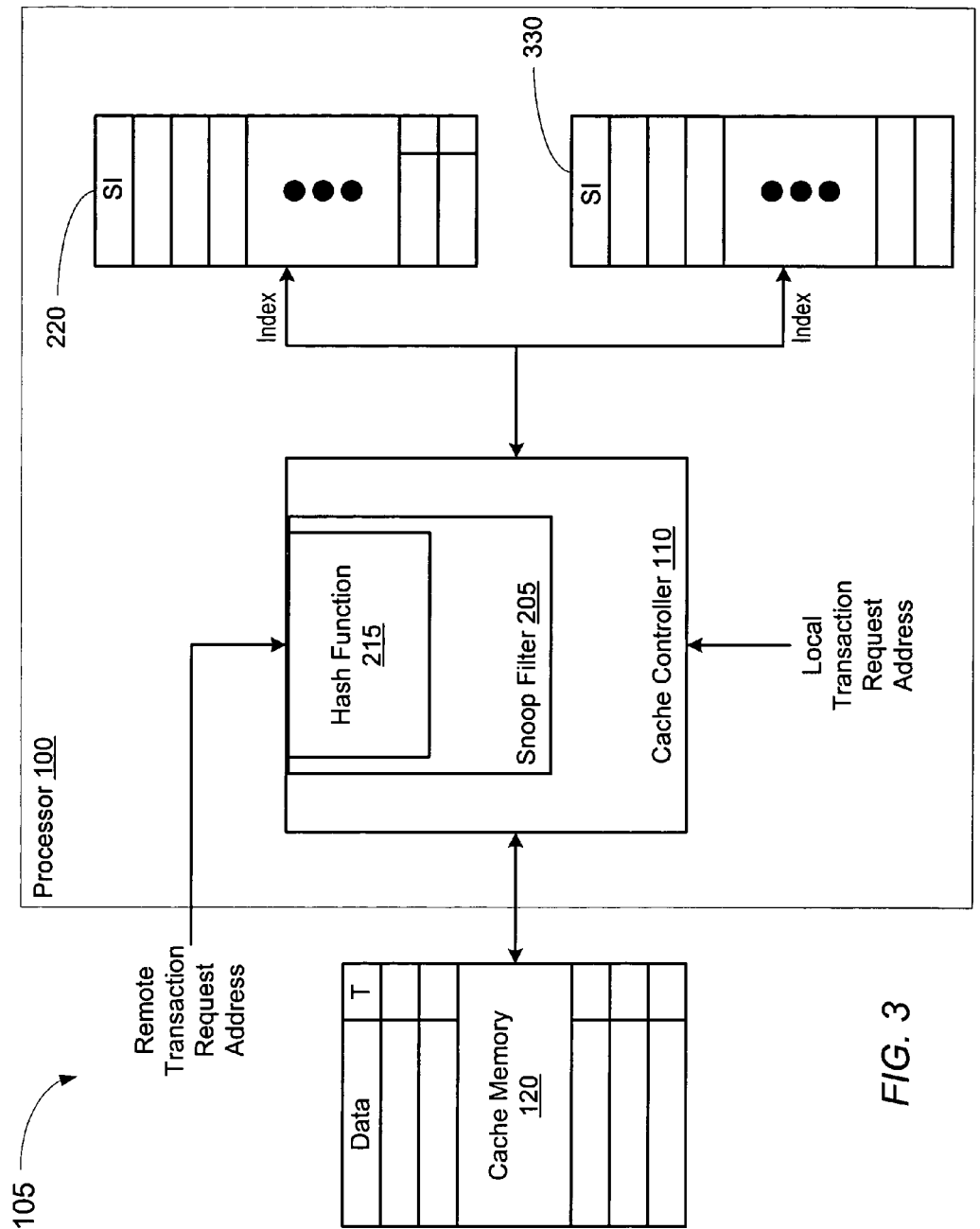
FIG. 3 is a block diagram of an alternative embodiment of the cache memory subsystem of FIG. 1 including a snoop filter employing a hash function.

Turning to FIG. 3, a block diagram of an alternative embodiment of cache memory subsystem 105 including a snoop filter employing a hash function is shown. Components that correspond to those shown in FIG. 1 are numbered identically for clarity and simplicity. It is noted that cache subsystem 105 of FIG. 3 includes all of the components and operates similar to cache subsystem 105 of FIG. 2. However, cache memory subsystem 105 of FIG. 3 additionally includes storage 330 and includes additional functionality as described below. As such, the operation of cache memory subsystem 105 of FIG. 3 that differs from the operation of cache memory subsystem 105 of FIG. 2 and/or is necessary for the understanding is described for simplicity. It is noted that in one embodiment, storage 330 is implemented on the same integrated circuit as cache controller 110.

In the illustrated embodiment, storage 330 is coupled to cache controller 110. Storage 330 may be substantially identical to storage 220. As described above in conjunction with the description of FIG. 2, the effectiveness of snoop filter 205 may decrease as storage 220 fills with snoop filter indications that are indicative that a cache line may be present within cache memory 120. Thus, to minimize false cache line hits, cache controller 110 is configured to stop using storage 220 and to use storage 330 after a population process of storage 330 is performed and storage 220 becomes full or substantially fill.

Accordingly, in one embodiment, cache controller 110 is configured to operate using two modes of operation. For example, during a first mode of operation, cache controller 110 filters snoops using storage 220 until storage 220 begins to fill as described above. Cache controller 110 is also configured to populate storage 330 with up-to-date snoop filter indications using bandwidth not used by local cache transactions. During a second mode of operation, cache controller 110 filters snoops as described above, except that storage 330 is used instead of storage 220.

Specifically, in one embodiment, during the population of storage 330, cache controller 110 is configured to iteratively access each location of cache memory 120 and to read the tag of each valid entry stored therein. In addition, snoop filter 205 is configured to perform hash function 215 on each tag that is read. As each new hash value is generated, cache controller 110 is configured to access and populate storage 330 with an up-to-date snoop filter indication for the tag of each valid entry stored in cache memory 120.

Once the population of storage 330 is complete, cache controller 110 is configured to filter snoops using storage 330. Further, in one implementation, in response to cache controller 110 beginning to use storage 330, cache controller 110 may be further configured to initialize each location of storage 220 to have a snoop filter indication that is indicative that the corresponding cache line is not present within cache memory 120, as previously described above. In one embodiment, the population process may repeat continuously and cache controller 110 may cycle between storage 220 and storage 330.

Since hash function 215 may generate the same hash function value and hence the same index for a number of different addresses within a given address range, a given snoop filter indication may only positively identify that a corresponding cache line of data is not stored within cache memory 120. As will be described in greater detail below, to increase the effectiveness of filtering snoops and to minimize false hits, additional hash functions may be used to more accurately identify whether a cache line may be present within cache memory 120.

Figure 4:
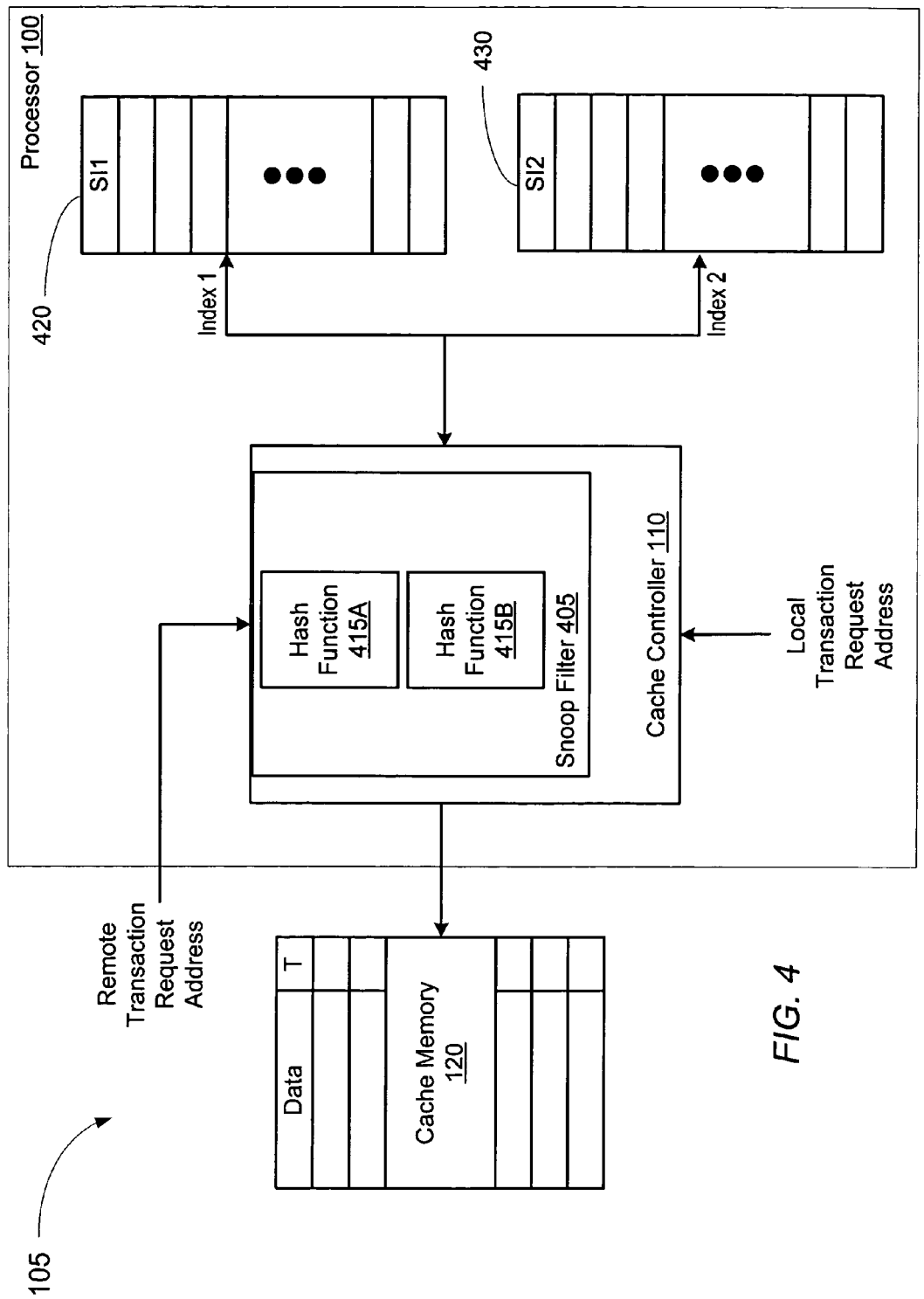
FIG. 4 is a block diagram of another alternative embodiment of the cache memory subsystem of FIG. 1 including a snoop filter employing a plurality of hash functions.

Referring to FIG. 4, a block diagram of another alternative embodiment of cache memory subsystem 105 including a snoop filter employing a plurality of hash functions is shown. Components that correspond to those shown in FIG. 1 are numbered identically for clarity and simplicity. Cache memory subsystem 105 of FIG. 4 includes a cache controller 110 coupled to a cache memory 120. Cache controller 110 is coupled to a storage 420 and a storage 430. It is further noted that in the illustrated embodiment, cache controller 110, storage 420 and storage 430 are manufactured on the same integrated circuit.

In the illustrated embodiment, cache controller includes a snoop filter 405 configured to receive remote cache transaction requests that include an address from other devices such as processor 150 of FIG. 1, for example. In addition, cache controller 110 is configured to receive local cache transaction requests from core logic within processor 100. As snoop filter 405 receives each remote cache transaction request, hash function 415A and hash function 415B are performed on the address associated with the remote cache transaction request. In addition, hash function 415A and hash function 415B are also performed on the address associated with some local cache transaction requests such as write requests, for example. Each resultant hash function value corresponds to an index for accessing storage 420 and storage 430, respectively.

In the illustrated embodiment, storage 420 and storage 430 each include a plurality of locations. In one embodiment, each location of storage 420 stores a first snoop filter indication (SI1) and as described above storage 420 may be accessed using a corresponding index. In addition, each location of storage 430 stores a second snoop filter indication (SI2) and as described above storage 430 may be accessed using a corresponding index. As will be described further below, in one embodiment, each snoop filter indication may be a single bit indicative of whether a given cache line is not present within cache memory 120. It is noted that in one embodiment, storage 420 and storage 430 may each include a greater number of locations than cache memory 120.

In one embodiment, cache subsystem 400 may be initialized during an initialization of processor 100, for example. In such an embodiment, since cache memory 120 may be empty after such an initialization, each location of storage 420 and storage 430 may be initialized to store a snoop filter indication indicating that the corresponding cache line is not present within cache memory 120. In one embodiment, each snoop filter indication may be a single bit having a logic value of zero, for example, to indicate that a corresponding cache line is not present within cache memory 120. It is noted however, that other embodiments may use other numbers of bits and/or other logic values to indicate that the corresponding cache line is not present within cache memory 120.

During operation, the core logic of processor 100 sends local cache transaction requests to cache controller 110 to write lines of data to cache memory 120. Cache controller 110 is configured to store the cache of data to cache memory 120. In one embodiment, snoop filter 405 performs hash function 415A and 415B on the address associated with each local cache transaction request to generate a respective hash function value. In addition, cache controller 110 is configured to store a snoop filter indication within the storage locations of storage 420 and storage 430 indexed by the hash function values. In one embodiment, each snoop filter indication may be a single bit having a logic value of one to indicate that a corresponding cache line may be present within cache memory 120. It is noted however, that other embodiments may use other numbers of bits and/or other logic values to indicate that the corresponding cache line may be present within cache memory 120.

In addition, in one embodiment, snoop filter 405 is configured to filter any snoops to cache memory 120 by checking storage 420 and storage 430 prior to performing a snoop of cache memory 120. For example, in response to receiving a remote cache transaction request, snoop filter 405 is configured to generate hash function values by performing hash functions 415A and 415B on the address corresponding to a remote cache transaction request. Snoop filter 405 reads snoop filter indication SI1 stored in the location within storage 420 indexed by hash function value 415A. Snoop filter 405 also reads the snoop filter indication SI2 stored in the location within storage 430 indexed by hash function value 415B. In one implementation, if either snoop filter indications SI1 or SI2 indicates that the cache line is not stored within cache memory 120, snoop filter 405 is further configured to ignore the remote cache transaction request. However, if both snoop filter indications SI1 and SI2 indicate that the cache line may be stored within cache memory 120, cache controller 110 is configured to perform a snoop operation to the cache memory 120 for the remote cache transaction request.

Similar to the descriptions of FIG. 2 and FIG. 3 above, as cache lines get evicted and new cache lines are stored, the snoop filter indications stored within storages 420 and 430 may become outdated and therefore erroneous. Further, as storages 420 and 430 become full of snoop filter indications that indicate that cache lines may be present within cache memory 120, the chance of falsely identifying a cache line as being present increases, which may make the effectiveness of snoop filter 405 decrease. Accordingly, in one embodiment, cache controller 110 may temporarily disable snoop filter 405 from filtering snoops and a repopulation process of storages 420 and 430 may be performed as described above in conjunction with the description of FIG. 2. As each tag is read from cache memory 120, hash functions 415A and 415B are used to repopulate storages 420 and 430, respectively.

Further, as described above in the description of FIG. 3, instead of temporarily disabling snoop filtering to repopulate the snoop filter storage, a second snoop filter storage may be employed. Similarly, it is contemplated that in another embodiment of cache subsystem 105 of FIG. 4, another pair of storages (not shown), which are substantially identical to storages 420 and 430, may be used to store snoop filter indications. In such an embodiment, cache controller 110 may alternately populate and switch between the sets of storages similar to the operation described in conjunction with the description of FIG. 3.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A mechanism for filtering snoop requests to a cache memory, said mechanism comprising:
   a first storage including a plurality of entries configured to store a first set of corresponding snoop filter indications;
   a second storage including a plurality of entries configured to store a second set of corresponding snoop filter indications; and
   a cache controller coupled to said first and said second storages and configured to receive a transaction request including an address;
   wherein said cache controller is configured to generate a first index value for accessing said first storage by performing a first hash function on said address and wherein said cache controller is configured to generate a second index value for accessing said second storage by performing a second hash function on said address;
   wherein said cache controller is further configured to selectively generate a snoop operation to said cache memory for said transaction request dependent upon a corresponding snoop filter indication stored in each of said first storage and said second storage that corresponds to said address.

2. The mechanism as recited in claim 1, wherein said cache controller is configured to generate said snoop operation to said cache memory for said transaction request if said corresponding snoop filter indication stored in each of said first storage and said second storage is a value indicative that a cache line corresponding to said address was stored within said cache memory.

3. The mechanism as recited in claim 1, wherein said cache controller is configured to ignore said transaction request if either of said corresponding snoop filter indications stored in said first storage and said second storage is a value indicative that a cache line corresponding to said address is not stored within said cache memory.

4. The mechanism as recited in claim 1, wherein, in response to a local cache memory request, said cache controller is further configured to store within said first storage said corresponding snoop filter indication at a first index value corresponding to an address associated with said local cache memory request and to store within said second storage said corresponding snoop filter indication at a second index value corresponding to said address associated with said local cache memory request.

5. The mechanism as recited in claim 1, wherein in response to a predetermined number of said plurality of entries of said first storage and said second storage becoming populated with said first and second sets of said corresponding snoop filter indications, respectively, said cache controller is further configured to disable filtering snoops by generating a snoop operation for said transaction request independent of said corresponding snoop filter indication stored in each of said first storage and said second storage.

6. The mechanism as recited in claim 5, wherein while said snoops are disabled, said cache controller is configured to perform a repopulation process of said first storage and said second storage.

7. The mechanism as recited in claim 6, wherein during said repopulation process, said cache controller is further configured to initialize each of said plurality of entries of said storage to an initialization value.

8. The mechanism as recited in claim 7, wherein during said repopulation process said cache controller is configured to read a tag corresponding to an address of each entry in said cache memory, generate a first index value associated with said tag using said first hash function, generate a second index value associated with said tag using said second hash function and to store a corresponding second snoop filter indication within each entry of said first storage and said second storage corresponding to said first index value and said second index value, respectively.

9. A method for filtering snoop requests to a cache memory, said method comprising:
   storing a first set of corresponding snoop filter indications within a first storage;
   storing a second set of corresponding snoop filter indications within a second storage; and
   receiving a transaction request including an address;
   performing a first hash function on said address and generating a first index value for accessing said first storage;
   performing a second hash function on said address and generating a second index value for accessing said second storage;
   selectively generating a snoop operation to said cache memory for said transaction request dependent upon a corresponding snoop filter indication stored in each of said first storage and said second storage that corresponds to said address.

10. The method as recited in claim 9 further comprising generating said snoop operation to said cache memory for said transaction request if said corresponding snoop filter indication stored in each of said first storage and said second storage is a value indicative that a cache line corresponding to said address was stored within said cache memory.

11. The method as recited in claim 9 further comprising ignoring said transaction request if either of said corresponding snoop filter indications stored in said first storage and said second storage is a value indicative that a cache line corresponding to said address is not stored within said cache memory.

12. The method as recited in claim 9 further comprising, in response to a local cache memory request, storing within said first storage said corresponding snoop filter indication at a first index value corresponding to an address associated with said local cache memory request and storing within said second storage said corresponding snoop filter indication at a second index value corresponding to said address associated with said local cache memory request.

13. The method as recited in claim 9 further comprising disabling filtering snoops by generating a snoop operation for said transaction request independent of said corresponding snoop filter indication stored in each of said first storage and said second storage in response to a predetermined number of said plurality of entries of said first storage and said second storage becoming populated with said first and second sets of said corresponding snoop filter indications, respectively.

14. The method as recited in claim 13 further comprising performing a repopulation process of said first storage and said second storage while said snoops are disabled.

15. The method as recited in claim 14 further comprising initializing each of said plurality of entries of said storage to an initialization value during said repopulation process.

16. The method as recited in claim 15 further comprising during said repopulation process, reading a tag corresponding to an address of each entry in said cache memory, generating a first index value associated with said tag using said first hash function, generating a second index value associated with said tag using said second hash function and storing a corresponding second snoop filter indication within each entry of said first storage and said second storage corresponding to said first index value and said second index value, respectively.

17. A mechanism for filtering snoop requests to a cache memory, said method comprising:
  means for storing a first set of corresponding snoop filter indications within a first storage;
  means for storing a second set of corresponding snoop filter indications within a second storage; and
  means for receiving a transaction request including an address;
  means for performing a first hash function on said address and generating a first index value for accessing said first storage;
  means for performing a second hash function on said address and generating a second index value for accessing said second storage;
  means for selectively generating a snoop operation to said cache memory for said transaction request dependent upon a corresponding snoop filter indication stored in each of said first storage and said second storage that corresponds to said address.

* * * * *